T. FAIRBANKS.
STEELYARD.
No. 4,761.
Patented Sept. 15, 1846.
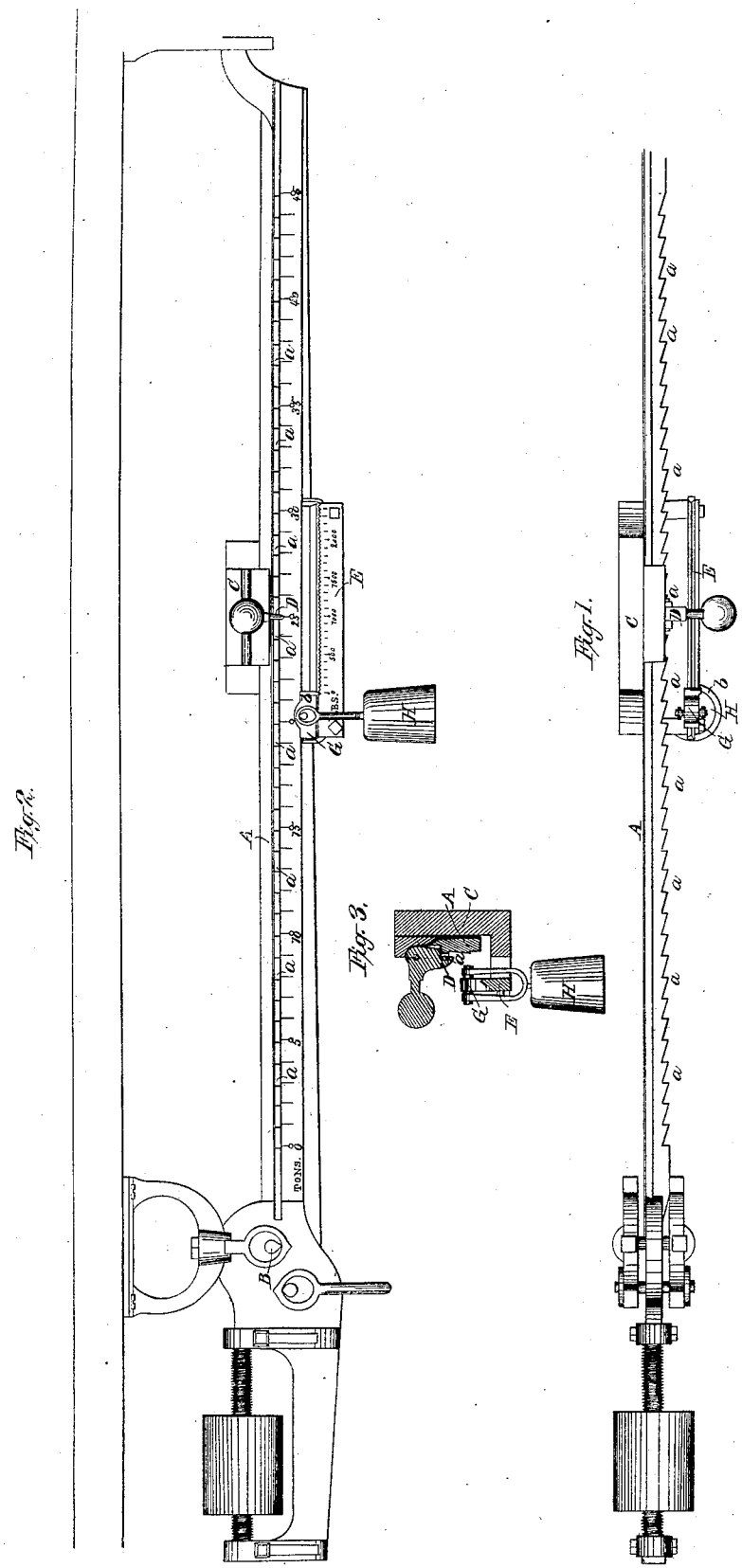

UNITED STATES PATENT OFFICE.

THADDEUS FAIRBANKS, OF ST. JOHNSBURY, VERMONT.

STEELYARD.

Specification of Letters Patent No. 4,761, dated September 15, 1846.

*To all whom it may concern:*

Be it known that I, THADDEUS FAIRBANKS, of St. Johnsbury, in the county of Caledonia and State of Vermont, have invented a new and useful Improvement in Steelyards or Apparatus for Weighing Heavy Bodies; and I do hereby declare that the nature of the same is fully set forth and represented in the following specification and accompanying drawings, letters, figures, and references thereof.

Of the said drawings, Figure 1 exhibits a top view or plan of a steelyard or scale beam, having my improvement applied to it. Fig. 2 is a front elevation and Fig. 3 is a transverse and vertical section of it taken centrally through the movable weight which slides to and fro upon the graduated arm.

In the said drawings, A denotes a steelyard lever or scale beam having graduations or divisions upon its front face. The said beam rests and plays upon a fulcrum B, and has the scale hung or attached to it in the usual manner. The said scale beam has a movable or adjustable weight C placed upon it and adapted to it, so as to rest upon and project below its top edge both in front and rear, as seen in the drawings. To the front side and upper part of the weight, I joint a small bent lever or index pointer D, having its upper arm disposed in a horizontal position and perpendicularly to the front face of the weight, and its lower arm extending downward, so as to engage with a series of shoulders or projections $a$, $a$, $a$, etc., made upon the front face of the graduated arm of the steelyard, there being one of said shoulders to each division of the lever, and the same being arranged over the said division as seen in Fig. 2.

The shoulders should be so disposed with respect to their respective divisions that on moving the lower arm of the index lever against any one of the shoulders, the weight C will be brought into its proper position to balance the weight indicated by the division to which said shoulder belongs.

The weight is made to extend below and underneath the scale beam, as seen in Fig. 3. To the front face of the part of it which so extends below and underneath the scale beam, I attach a short graduated scale E, upon the upper edge of which, I place a small saddle or carriage G having a weight H, suspended from it. The upper edge of the scale E over the divisions of the scale, is suitably notched, so as to receive a small index pointer or projection $b$ extending downward from the carriage G, as seen in Fig. 2, and for the purpose of indicating the division upon the scale which represents the fractional part of a ton, or any other assumed weight, denoted by each of the divisions of the scale beam to represent even tons, hundred weights or pounds, those on the small scale E should be arranged so as to indicate fractional parts of one ton, one hundred weight or one pound.

If the body to be weighed contains twenty tons, twelve hundred and fifty pounds, we move the weight C, along the scale beam until we find that the index lever B depresses the beam nearly to a horizontal line. This it will do, when it passes beyond the shoulder $a$ of the division which represents twenty tons. We then push or slide back the weight until the index lever abuts against the said shoulder. We next move the secondary weight H upon the scale E, until it brings the beam E to a horizontal position, which it will when the index pointer of it reaches the notch of the division which represents twelve hundred and fifty pounds.

The scale beam is borne downward by the united pressure of the weights H and C, and scale E. Therefore, the weight H constitutes a part of that which is always in action upon the scale beam and whenever the weight C is moved upon the beam, the small weight H should first have its index pointer adjusted to the zero or commencement of the scale. On moving it on its scale outward or in a direction away from the fulcrum B, we change the center of gravity of the whole weight pressing upon the scale beam, or throw it farther from the fulcrum B.

My invention, when applied to a scale beam, of a platform balance renders it of great value particularly when adapted to weigh very heavy matters, such as coal, and when great dispatch in conducting the weighing operation is desirable, as it renders useless, and completely obviates the labor of lifting, the large weights or poises, otherwise so frequently required. It is particularly useful for weighing cars and trains of freight on railways.

My improvement, and, therefore, that which I claim, consists in the auxiliary scale (E) and weight (H) as combined and operating with the main weight (E) substantially in the manner and for the purpose as above specified.

In testimony whereof, I have hereto set my signature, this eleventh day of April A. D. 1846.

THADDEUS FAIRBANKS.

Witnesses:
 HIRAM KNAPP,
 J. P. FAIRBANKS.